(No Model.) 3 Sheets—Sheet 1.

J. ROBERTSON.
MODE OF COUPLING TUBES OR PIPES.

No. 407,037. Patented July 16, 1889.

WITNESSES:
E. J. Griswold
John Revell

INVENTOR
James Robertson
BY
Howson and Sons
his ATTORNEYS (No Model.) 3 Sheets—Sheet 2.

J. ROBERTSON.
MODE OF COUPLING TUBES OR PIPES.

No. 407,037. Patented July 16, 1889.

WITNESSES:
E. J. Griswold
John Revell

INVENTOR
James Robertson
BY
Howson and Son
his ATTORNEYS (No Model.) 3 Sheets—Sheet 3.
J. ROBERTSON.
MODE OF COUPLING TUBES OR PIPES.
No. 407,037. Patented July 16, 1889.
Fig. 18.    Fig. 19.    Fig. 20.    Fig. 21.
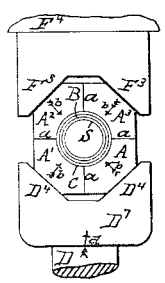 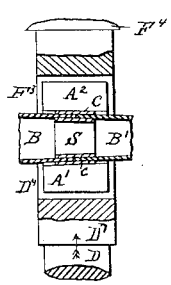 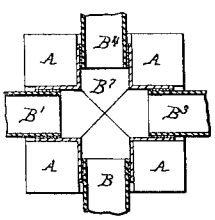 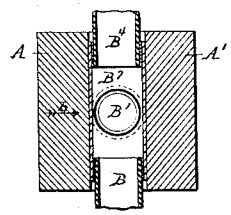
Fig. 22.    Fig. 23.    Fig. 26.    Fig. 27.
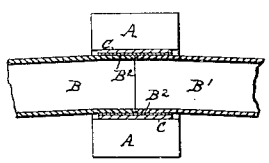 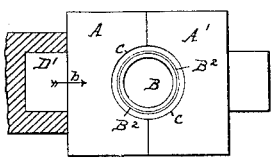  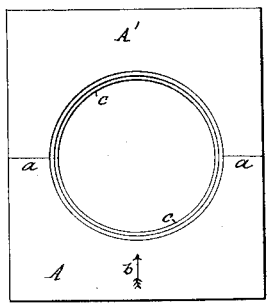
Fig. 24.    Fig. 25.
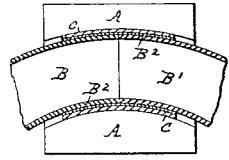 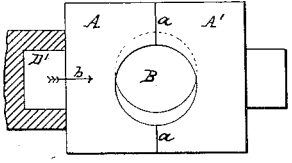
Fig. 28.    Fig. 29.    Fig. 30.
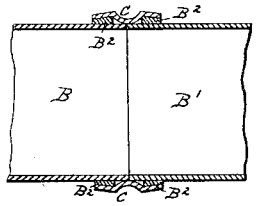 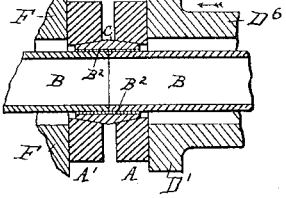 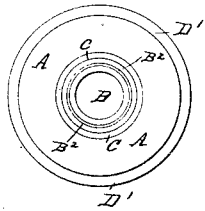
WITNESSES:
E. J. Griswold.
John Revell.
INVENTOR
James Robertson
BY
Howson and Sons
his ATTORNEYS

UNITED STATES PATENT OFFICE.

JAMES ROBERTSON, OF GLASGOW, COUNTY OF LANARK, SCOTLAND.

MODE OF COUPLING TUBES OR PIPES.

SPECIFICATION forming part of Letters Patent No. 407,037, dated July 16, 1889.

Application filed September 2, 1887. Serial No. 248,606. (No model.) Patented in England November 18, 1886, No. 14,993.

*To all whom it may concern:*

Be it known that I, JAMES ROBERTSON, a subject of the Queen of Great Britain and Ireland, and a resident of Glasgow, in the county of Lanark, Scotland, have invented certain Improvements in Coupling Pipes or Tubes, (for which I have obtained Letters Patent in Great Britain, No. 14,993, dated November 18, 1886,) of which the following is a specification.

My invention consists in a new or improved art or method of uniting or coupling metal tubes or pipes by crushing, jointing, and securing thereon coupling-sockets of wrought-iron or steel or similar hard metal in a cold state by direct lateral or radial compression, as hereinafter more fully described. The essential feature is that the couplings or tubes are operated on while in a cold state, or so cold as not to be made soft by heat and not to injure any ordinary interposing jointing materials when these may be used. No artificial heat is given to the external coupling or coupling faucet, tube, or pipe end to obtain shrinkage by cooling, as has been used for making some forms of tube-couplings, to obtain the said shrinking, shaping, and securing action.

My invention is only designed for working on metallic couplings—such as of wrought-iron or steel—and is not suitable for soft-metal or hose pipes, and it is no part of my invention to use it for these purposes.

In proceeding to explain how my invention is carried into effect, in connection with the accompanying drawings, I describe the various figures fully in sequence, in order as far as possible to avoid needless repetition in describing the various modifications shown. The arrows indicate the direction of the closing motion of the matrices in all the figures.

Figure 1 is an end elevation, and Fig. 2 a side sectional elevation, of one form of my tube-joint-making matrix, of cast-steel and formed in halves A A', of a semicircular form internally, and of a length somewhat greater than the coupling-jointing sockets they are designed to compress. The meeting surfaces at $a$ of the two parts A and A' of the matrix are planed, and in this state are shown as bored out truly in a lathe to the exact diameter and form lengthwise of the socket to be operated upon when such socket is compressed upon the two tubes it is made to connect and joint. The internal form of parts A and A' lengthwise in this example is of a slightly-curved form and somewhat larger in diameter in the center of its length than at its ends, as shown in Fig. 2. The abutting and opposite surfaces in each half are also planed truly and parallel crosswise in the center of the matrix, in order that the lower half may rest squarely upon a hydraulic ram head or table and in the upper half to rest equally upon the entablature or cross-head of a hydraulic press.

Fig. 3 is an end elevation, and Fig. 4 a side sectional elevation, of this same matrix with the half-matrices A and A' opened out or sundered a sufficient distance apart for the insertion of the ends of the two pieces of the wrought-iron tube B B' to be coupled, and the jointing materials $B^2$ shown laid over their ends, which in this example consists of hemp cord, about three-sixteenths of an inch in diameter, wound on closely upon the surface of each end of the tubes B and B' to be jointed, and are here shown placed in the matrix. The coupling-socket C is of an internal diameter sufficiently large to be passed freely over the jointing materials $B^2$ by hand, being also shown placed in the matrix.

Fig. 5 is an end elevation, and Fig. 6 a side elevation, of a hydraulic press, shown applied for compressing together these half-matrices A and A'. The half-matrices A and A' are shown in end elevation in Fig. 5 and in side sectional elevation in Fig. 6, and shown in both views closed up on the socket C, and the socket-joint and tubes all compressed up to the size and shape of the finished socket-joint of the tube, the form of it being best shown in Fig. 6, in which it will be seen that the jointing materials $B^2$ (from the matrix being slightly larger in diameter at the center of its length than at its ends) are more closely compressed up at the ends than in the center of its length, and the tubes themselves B B' also slightly compressed inward at the ends of the socket C, which may readily be done to further secure the socket on the tubes. The hydraulic press shown used in this example for compressing up the matrix A A' and its contents is of the ordinary form of a hydraulic packing-press, and may be worked either by hand or power pumps in the ordinary way. The ram D requires only a very short traverse for this purpose, and it and its cylinder E are formed correspondingly short. The ram-head D' has formed in it T-slots D² for the T-headed bolts F' shown, for bolting the lower half-matrix A to it; and the cross-head F, which has its abutting surface also truly faced, has also formed on it similar T-slot holes for the T-headed bolts F², the bolts being shown also placed in these, the top half-matrix A' being in this way adjusted and fixed opposite its lower half A, so that when brought together the internal surface of the matrix presents an internal round smooth surface, as it has when it leaves the lathe, for compressing up the socket C to the size and form required, all as shown by the drawings. The hydraulic cylinder and its ram-cover E' are shown in section in Fig. 5, and the four main-stay pillars G G' G² G³, for supporting the cross-head F, are shown with long screws for adjusting or raising and lowering the entablature or cross-head by the screw-nuts G⁴, to suit any required size of matrix; but otherwise it is, as before stated, of the form of an ordinary hydraulic packing-press and wrought and regulated by hydraulic hand-power or other power pumps, the water entering the cylinder from the pump or pumps by the pipe H being shown in Fig. 6, and need not be more accurately described.

The press for operating the matrices may be variously formed, according to the size and shape of the tube being operated upon and according to the purposes for which they are used, this form of press being suitable mainly for large-sized tubes being shaped, jointed, or coupled in the work-shop.

Fig. 7 is a side elevation, Fig. 8 an end sectional elevation and Fig. 9 a plan, of a portable pendulous hydraulic press constructed entirely of steel. The bottom half A of the matrix forms at the same time the cross-head F of the frame of the press, the top half-matrix A' and piston or ram D being formed in one piece, as shown in section in Fig. 7. The stays G⁷ G⁷ are of flat-bar form, with recesses cut out in them, as shown in Figs. 8 and 9, for the water-cylinder E and cross-head F, and held in their place on these by the four bolts G⁵. The ram or piston D in this example is shown provided with packing-leather, in the ordinary manner of other hydraulic presses, and is further provided with a reduced-diameter guiding tail end D³, working in a corresponding reduced-diameter end recess E² in the cylinder. This arrangement of piston and cylinder is necessary to prevent the ram D from canting and binding in the cylinder should the strain of the pressure be put on the socket unevenly. The top end D³ of the ram is tapped, and is shown further provided with the round lifting-eye-bolt E³ screwed into it, to which the shackle of the lifting and suspending chain I is attached for lifting and moving about the whole press. This eyebolt-spindle E³ is shown provided with a cup stuffing-leather and cover E⁴, and, besides, forming the connection for suspending and moving the entire press. This arrangement also provides a means of drawing back the ram D after is has been pressed down on a socket or other article. The weight of the press thus suspended falls down by its weight over the ram after the release-water valve is opened, and the return-stroke is thus effected quickly by this simple means. A socket C and joint B² and tubes B and B' are shown compressed up in the matrix of the largest size the press is designed to take in, same as explained in connection with Figs. 5 and 6. For making the joints of smaller sizes of tubes, a series of smaller matrices A⁰ A¹⁰, of a semicircular bush form, or liners are used to go into the matrix A A', as shown in Figs. 10 and 11, Fig. 10 being an end elevation, and Fig. 11 a side elevation, partly in section, of one of these liner-matrices. The external diameter of this matrix is of the same diameter as the internal diameter of the matrix A A', formed in the cross-head F and ram D, (shown in Figs. 7 and 8,) and fits into same, and in this simple way any smaller sizes of matrices for making a joint over any smaller diameter of tube is readily obtained, and these bush-formed matrices may be readily made thick or thin or lined up with sheet metal of any shade of thickness to suit the varying sizes of tubes, coupling-sockets, or other joints that may be required to be shaped or made, and in this simple way a joint over any size of tube or socket less than the main size of the matrix so formed is accomplished, these liners being a ready and simple means of varying the sizes of these matrices A A' in all forms.

In carrying out my invention for operating these matrices hydraulic tools can be used of the pendulous pulling hydraulic lift form or in the forms very similar to stationary and portable hydraulic riveting-machines of the tongs and other forms.

For use in the tube-manufactory, or elsewhere for shrinking and fixing on pipe-flanges and the like, stationary hydraulic presses can be used for forming the matrices upon the coupling parts of tubes of almost any shape.

The matrices may be composed of two or more pieces, and it will be an advantage generally to use the matrices in pieces, particularly for large diameters of tubes angularly set in hydraulic ram-heads, so as to close in upon the coupling or faucet radially and simultaneously instead of by direct side pressure.

The couplings may be made conical-ended, and internal conical-ended matrices can be made to close the matrix by a pulling hydraulic tool pulling in the lengthwise direction of the tubes to compress in the coupling on the tube. For the purpose of making this compressing action more easily accomplished by another new and improved means of fixing socket-couplings and the like on tubes, I form beveled or V-shaped couplings, by which, when compressed up on one side, they compress in the internal diameter of the coupling and tighten up the joint by diminishing the diameter of the coupling. In this way the operation of closing these matrices over their tubular contents may be accomplished by screws and by like mechanical means.

Fig. 12 is an external plan, Fig. 13 a sectional plan, and Fig. 14 an end elevation, of a form of hydraulic tool for effecting the compression of the matrices by pulling action, which is shown adapted to be used in a pendulous form, Fig. 13 being a section through the line 1 1 in Fig. 14, showing the two single-acting water-pistons Q Q, working in cylinders $E^6$, formed in the container or cross-head F, with piston-rods $Q'$ $Q'$ passing through a leather-packed stuffing-cover $E^7$, and each attached to a cross-bar R, which acts on the end of the matrix A A', formed in halves. This cross-bar R has an aperture in it $R^2$, through which the tube to be shaped or jointed is made to pass, and is shown in elevation by Fig. 15. The cross-head container F is provided with an eye-suspending snug $F^5$, (shown in Figs. 12 and 14,) to which is attached the lifting and suspending chain I. The action of this matrix on the socket or tubes will be readily understood from the foregoing description.

Two or more hydraulic rams may also be used combined for compressing on the matrices, where the matrices are formed of more than two pieces and where their line of centers radiate from the line of the tube they are made to operate upon; and the rams may be of a square or other form instead of a round form, as shown in these modifications of hydraulic machines for these purposes; but it will generally be convenient to use only three pieces in the matrices, even where the diameters of the tubes are very large, and one hydraulic cylinder and ram will best serve this purpose by using a modification of ram-head with inclined surfaces or abutting cross-head with inclined surfaces, which may be in various forms.

The forms of matrices hereinafter shown are suited to be operated by hydraulic presses similar to those described in connection with Figs. 5 and 6, the same letters and numerals referring to like parts, and the arrows on the matrices and rams indicating the direction of their closing-up motions, thus rendering a separate detailed description unnecessary.

Fig. 16 is an end elevation, and Fig. 17 a side elevation, partly in section, of a ram-head $D^7$, formed with inclined sloping edges $D^4$, in which the two matrices A A', with corresponding sloping end $A^7$, are placed, the third matrix-piece $A^2$ being held stationary on the cross-head F. The motion of the ram D upward, as indicated by the arrows $d$ closing in the matrix parts A and A', in the direction indicated by the arrows at $b$ $b$, placed on the parts of the machine.

Fig. 18 is an end elevation, and Fig. 19 a side elevation, partly in section, of a matrix in four pieces A A' $A^2$ $A^3$, and the ram-head $D^7$ is formed with inclined surfaces $D^4$, and the cross-head $F^4$ is formed with inclined surfaces $F^3$. The closing motion of the ram is indicated by the arrow at $d$ on the ram-head, and the closing motion of the matrices by the arrows at $b$. In this example two pieces of taper-tube B B' are shown coupled with an external socket C and internal nipple S, which for structural purposes gives increased strength.

Fig. 20 is a sectional plan, and Fig. 21 a sectional elevation, of a matrix in two halves A and A', adapted for compressing on a four-way branch tube-coupling piece $B^7$, fitting over the tubes B B' $B^4$ $B^3$. These matrices can be adapted for coupling or jointing tubular branches B, placed in any direction to each other, and any number of them at one operation, as here shown, or by separate operations, and either by compressing on the tube over the coupling $B^7$, or, as here shown, by compressing the coupling over the tubes, suitable for tube-joints for the conveyance of fluids or for structural purposes, such as jointing up the parts of tubular boilers together.

Fig. 22 is a sectional plan, and Fig. 23 an end elevation, of a matrix similar to those described in connection with Figs. 1 to 6, but is here shown coupling two tubes B and B' out of line with each other, as is frequently required in laying down lines of pipes or tubes. The ordinary straight matrix readily effects this with straight tubes of wrought iron or steel to a limited extent, as shown, by fixing the tubes B B' in the direction required before the matrix is closed down, and in laying down cast-iron or cast-steel pipes by using a thick joint of lead or other suitable material. For greater degrees of bend at the joint of the tube, a curved matrix shaped to the degree of curve required is used.

Fig. 24 is a sectional plan, and Fig. 25 an end elevation, of a jointing-matrix for still greater degrees of bend than shown in Figs. 22 and 23.

Fig. 26 is a sectional plan, and Fig. 27 an end elevation, of a matrix of a form suitable for sizing accurately and producing a flat ring of wrought-iron or steel—a form suitable for lead joints which may be run by hand in the ordinary way, particularly for large diameters of tubes.

Figure 1:
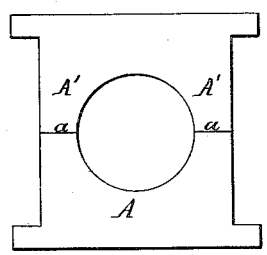
Figure 2:
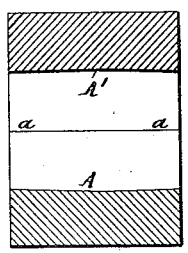
Figure 3:
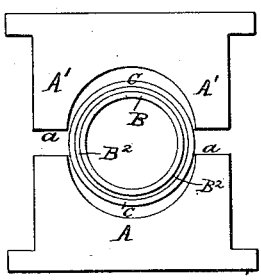
Figure 4:
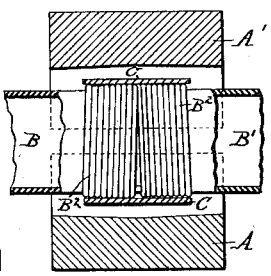
Figure 5:
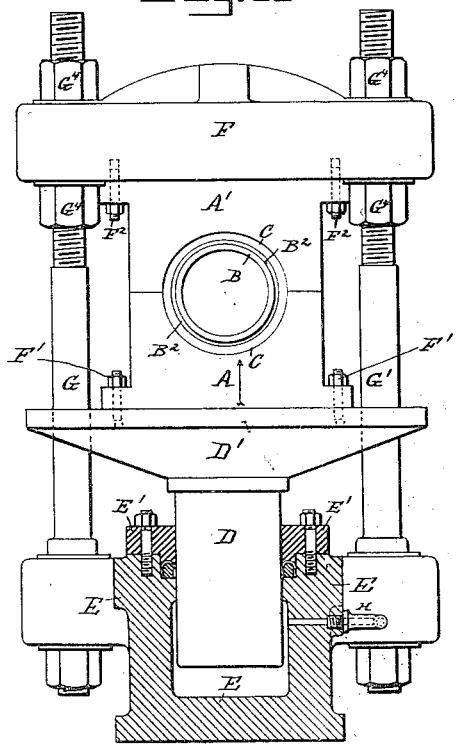
Figure 6:
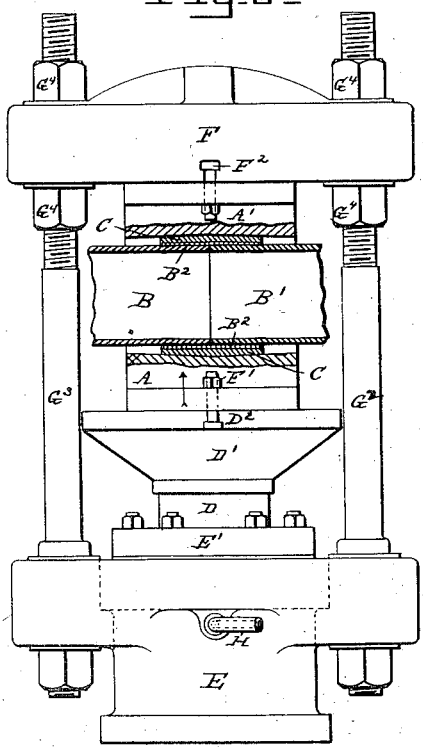
Figure 7:
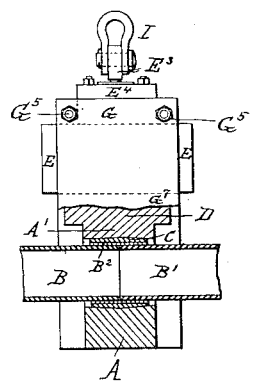
Figure 8:
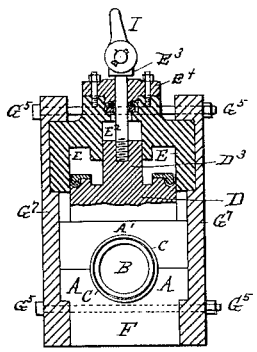
Figure 9:
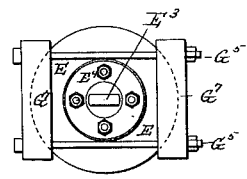
Figures 10, 11:
Figure 12:
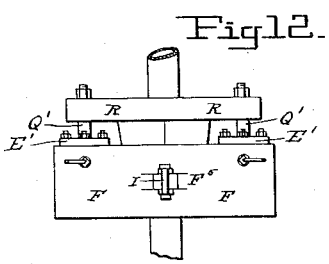
Figure 13:
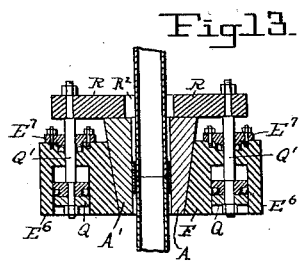
Figures 14, 15:
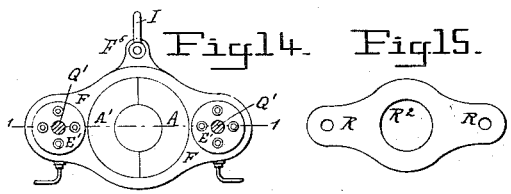
Figure 16:
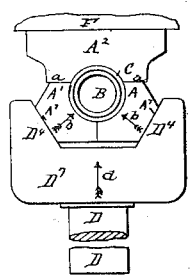
Figure 17:
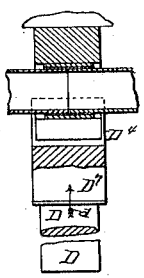

Fig. 28 shows a joint in section made over two pieces of cast-iron tube B and B', with the coupling-socket C and lead joint $B^2$ placed in same. For compressing on or jointing conical-ended sockets and conical socketed flanges, these can be placed on tubes by these improved applications of hydraulic presses and improved forms of same by using similar conical-shaped matrices by giving to the internal conical matrix such a degree of bevel as will not jam the article operated upon, by preference made of steel and hardened all in one piece; and it is part of my invention to use these in conjunction with these hydraulic presses, as described.

Fig. 29 is a sectional plan, and Fig. 30 an end elevation with portion of the cross-head removed, showing a conical matrix in halves, but in continuous rings in each piece, with a hollow ram $D^6$, showing all closed up over the socket C and tubes B B'.

Although most of the coupling-sockets C have been shown in the drawings as formed with their joints compressed on the pipes B B', with jointing material $B^2$ between them, it is to be understood that they might all be similarly compressed and formed metal to metal without jointing material between them.

It is no part of my invention to use pressure force by hammers, stampers, or otherwise for operating these matrices for these new and improved tube shaping, coupling, and jointing purposes for which it is unsuitable; and I have to state that I make no claim to the compressing or shaping of metallic tubes or pipes, or to the compressing, jointing, or shrinking on of rings, flanges, or coupling-sockets on these while in a hot or heated state; nor do I claim the doing of this in a cold state by hammering or by percussive blows or impact, or by expanding tools from within.

I am aware also that it has been proposed to squeeze up sockets of lead or similar soft metal upon tubes, as described in Hill's British Patent, No. 1,635, of 1858; but my invention is carried out in a different way and upon very different materials.

My invention is not applicable to soft-metal work.

I claim as my invention—

1. The mode herein described of coupling tubes or pipes, said mode consisting in placing over the adjacent ends of the tubes or pipes to be coupled a wrought-iron or steel socket and then crushing the hard-metal socket in a cold state onto the said tubes or pipes by direct radial or lateral compression, diminishing the diameter of the socket, all substantially as set forth.

2. The mode herein described of coupling tubes or pipes, said mode consisting in placing over the ends of the tubes or pipes to be coupled a wrought-iron or steel coupling socket, interposing a jointing material, and crushing this hard-metal socket in a cold state onto the said tubes or pipes and jointing material by direct lateral or radial compression, diminishing the diameter of the socket, all substantially as set forth.

In testimony whereof I have signed my name to this specification in the presence of two subscribing witnesses.

JAMES ROBERTSON.

Witnesses:
 W. R. N. THOMSON,
 JOHN SIME,
*Both of 96 Buchanan Street, Glasgow, Scotland.*